(12) United States Patent
Hennecke et al.

(10) Patent No.: US 7,392,189 B2
(45) Date of Patent: Jun. 24, 2008

(54) SYSTEM FOR SPEECH RECOGNITION WITH MULTI-PART RECOGNITION

(75) Inventors: Marcus Hennecke, Um (DE); Walter Koch, Oldezhausen (DE); Gerhard Nüßle, Blaustein (DE); Richard Reng, Neu-Ulm (DE)

(73) Assignee: Harman Becker Automotive Systems GmbH (DE)

( * ) Notice: Subject to any disclaimer, the term of this patent is extended or adjusted under 35 U.S.C. 154(b) by 741 days.

(21) Appl. No.: 10/371,982

(22) Filed: Feb. 21, 2003
(Under 37 CFR 1.47)

(65) Prior Publication Data
US 2004/0034527 A1 Feb. 19, 2004

(30) Foreign Application Priority Data
Feb. 23, 2002 (DE) ................. 102 07 895

(51) Int. Cl.
*G10L 15/04* (2006.01)
*G10L 15/00* (2006.01)
*G10L 15/18* (2006.01)

(52) U.S. Cl. .................. 704/254; 704/251; 704/257

(58) Field of Classification Search ................. None
See application file for complete search history.

(56) References Cited

U.S. PATENT DOCUMENTS

| | | | | |
|---|---|---|---|---|
| 4,718,094 A | * | 1/1988 | Bahl et al. ................. | 704/256 |
| 4,827,521 A | * | 5/1989 | Bahl et al. ................. | 704/256.4 |
| 4,866,778 A | | 9/1989 | Baker | |
| 4,962,535 A | * | 10/1990 | Kimura et al. ............... | 704/252 |
| 5,018,201 A | * | 5/1991 | Sugawara ................... | 704/252 |
| 5,054,074 A | * | 10/1991 | Bakis ......................... | 704/240 |
| 5,202,952 A | | 4/1993 | Gillick et al. | |
| 5,825,977 A | * | 10/1998 | Morin et al. ................. | 704/255 |
| 5,924,070 A | * | 7/1999 | Ittycheriah et al. .......... | 704/275 |
| 6,092,044 A | * | 7/2000 | Baker et al. ................. | 704/254 |
| 6,108,631 A | | 8/2000 | Rühl | |
| 6,230,132 B1 | | 5/2001 | Class et al. | |

(Continued)

FOREIGN PATENT DOCUMENTS

DE EP0282272 * 9/1988

(Continued)

OTHER PUBLICATIONS

Sarukkai et al., "A novel word pre-selection method based on phonetic set indexing", 1996 IEEE International Conference on Acoustics, Speech, and Signal Processing, May 7-10, 1996, pp. 857-860, vol. 2.*

(Continued)

*Primary Examiner*—David Hudspeth
*Assistant Examiner*—Brian L. Albertalli
(74) *Attorney, Agent, or Firm*—Brinks Hofer Gilson & Lione

(57) ABSTRACT

A speech recognition system for processing voice inputs from a user to select a list element from a list or group of list elements. Recognition procedures are carried out on the voice input of the user. One recognition procedure separates the voice input of a whole word into at least one sequence of speech subunits to produce a vocabulary of list elements. Another recognition procedure compares the voice input of the whole word with the vocabulary of list elements.

18 Claims, 2 Drawing Sheets

U.S. PATENT DOCUMENTS

| | | | | |
|---|---|---|---|---|
| 6,249,763 | B1 * | 6/2001 | Minematsu | 704/252 |
| 6,985,861 | B2 * | 1/2006 | Van Thong et al. | 704/254 |
| 2001/0016813 | A1 * | 8/2001 | Brown et al. | 704/231 |
| 2003/0065511 | A1 * | 4/2003 | Franco et al. | 704/243 |

FOREIGN PATENT DOCUMENTS

| | | |
|---|---|---|
| DE | 197 09 518 C1 | 3/1998 |
| DE | 198 13 605 A1 | 9/1999 |
| DE | 101 29 005 A1 | 1/2003 |
| EP | 0 282 272 A1 | 9/1988 |
| EP | 0 961 263 A2 | 12/1998 |
| EP | 0 905 662 A2 | 3/1999 |
| EP | 0 945 705 A2 | 9/1999 |
| EP | 1 162 602 A1 | 12/2001 |
| WO | WO 99/00790 | 1/1999 |
| WO | WO 01/18793 A1 | 3/2001 |
| WO | WO 02/103678 A1 | 12/2002 |

OTHER PUBLICATIONS

F. Neubert, G. Gravier, F. Yvon and G. Chollet, XP-00211049 "*Directory Name Retrieval Over the Telephone in the Picasso Project*" IEEE, pp. 31-36, 1998.

* cited by examiner

SYSTEM FOR SPEECH RECOGNITION WITH MULTI-PART RECOGNITION

BACKGROUND OF THE INVENTION

1. Technical Field

This invention relates to speech recognition systems. More particularly, this invention relates to speech recognition systems for a user to select a list element from a list or group of list elements.

2. Related Application

This application claims priority under 35 U.S.C. §119(a) to German application number 10207895.5, filed on Feb. 23, 2002.

3. Related Art

Many electronic applications have design processes or sequences that are speech-guided or speech-controlled by a user. The electronic applications include destination guidance (navigation) systems for vehicles, telephone and/or address systems, and the like. Vehicles include automobiles, trucks, boats, airplanes, and the like.

In these processes or sequences, a user provides a voice input to a speech recognition unit. The voice input can correspond to a list element that the user desires to select from a list or group of list elements. The speech recognition unit processes the voice input and selects the desired list element in response to the processed voice input.

Speech recognition units typically process a limited number of voice inputs. Many speech recognition units can process only a few thousand words (voice inputs) or list elements. When there are large numbers of list elements, the speech recognition unit may not function or may not function properly without additional conditioning or processing of the voice input. The recognition performance may be too low or insufficient memory may exist. Many applications have an extensive number of list elements, especially when the list comprises most or all of the available list elements. Such applications include destination guidance (navigation) systems and telephone systems. Navigation and telephone systems typically include numerous city and street names. Telephone systems typically include numerous personal names. These applications may have lists with list elements numbering in the tens to hundreds of thousands. In addition, many speech recognition units may not differentiate between similar sounding list elements, especially when there are numerous list elements that sound alike.

SUMMARY

A speech recognition system is provided for processing voice inputs from a user to select a list element from a list or group of list elements. Recognition procedures may be carried out on the voice input of the user such that the user only has to speak the whole word of a desired list element. The system allows a user to select a list element from large lists of list elements. The large list is clustered, e.g., compressed by summarization, to be easier handled by a recognizer.

A first recognition procedure can separate the voice input of a whole word into at least one sequence of speech subunits. The subunits are used in a matching procedure to create a sub-list, e.g., the vocabulary for a second recognition procedure. A second recognition procedure can compare the voice input of the whole word with the vocabulary of list elements. In this way, the recognition procedures can obtain accurate and reliable speech recognition at reduced memory costs.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION OF THE PREFERRED EMBODIMENTS

Figure 1:
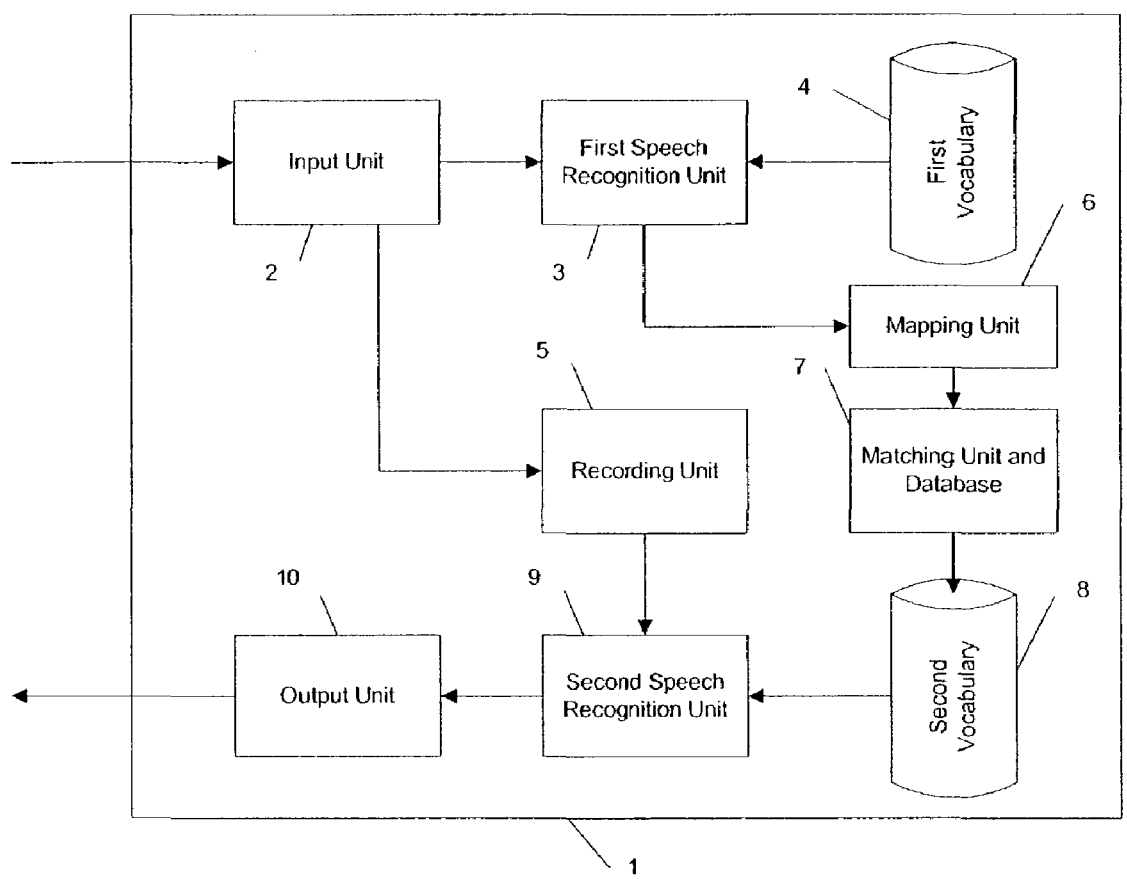
FIG. 1 represents a block diagram or flow chart of a speech recognition system.

FIG. 1 represents a block diagram or flow chart of a speech recognition system 1, which may be implemented in an electrical device such as a navigation system for a vehicle, a telephone system, or the like. The system 1 allows a user to select a list element from large lists of list elements. The large list is clustered, e.g., compressed by summarization, to be easier handled by a recognizer. The speech recognition system 1 includes an input unit 2, a first speech recognition unit 3, a first vocabulary 4, a recording unit 5, a mapping unit 6, a matching unit and database 7, a second vocabulary 8, a second speech recognition unit 9 and an output unit 10. A first recognition process and a second recognition process are preformed, e.g., consecutively, with two vocabularies using the same or different speech recognition units. In accordance with results of the first recognition process a matching process generates a sub-list that is used as vocabulary for the second recognition process. The input unit 2 may be a microphone or similar device. The first and second speech recognition units 3 and 9 may be implemented by one or more microprocessors or similar devices.

The first vocabulary 4, recording unit 5, matching unit and database 7, and second vocabulary 8 may be implemented by one or more memory devices. The memory device can include computer-readable data and/or instructions encoded on a computer-readable storage medium. Examples of the computer-readable storage medium include, but are not limited to, an optical storage medium, and electronic storage medium and a magnetic storage medium. The output unit 10 may be a speaker, display unit, combination thereof, or the like. The speech recognition system 1 may be implemented on a digital signal processing (DSP) or other integrated circuit (IC) chip. The speech recognition system 1 may be implemented separately or with other electrical circuitry in the electrical device. While a particular configuration is shown, the speech recognition system 1 may have other configurations including those with fewer or additional components.

The speech recognition system 1 processes speech or voice inputs from a user to select a list element from a list or group of list elements. The list could be any assembly of data, related or unrelated. The list elements are particular data entries in list. The list may contain navigation data for a navigation system or contact data for a telephone system. The navigation data may include place names and street names as list elements. The contact data may include personal names, place names, street names, and telephone numbers as list elements. The list may contain other data.

To select a list element, the user states, speaks or otherwise provides a speech or voice input to the input unit 2. The voice input is a full description of the desired list element. The whole word is the entire list element as spoken. The whole word is stored in recording unit 5. The speech recognition unit 3 receives the voice input from the input unit 2. The voice input may be processed acoustically to reduce or eliminate unwanted environmental noises, such as with the speech recognition units 3 and/or 9, and/or with the input unit 2. The speech recognition unit 3 is configured with the vocabulary 4 to separate the voice input of the user into speech subunits. For example, the speech recognition unit 3 breaks down the voice input into phonemes.

The first speech recognition unit 3 can access the mapping unit 6 and utilize the mapping unit 6 to convert the speech subunits into characters of a character sequence. For example, the mapping unit 6 converts phonemes into letters or a letter sequence. The matching unit and database 7 holds the list or group of list elements to be searched. Matching unit and database 7 may hold a whole, entire, or an extensive list having any number of list elements. The components of the speech recognition system 1 are configured for use with any type of data as the list elements, such as characters or letters. The list of list elements may be installed on the matching unit and database 7 during manufacture and/or during subsequent operation of the electrical device that has the speech recognition system 1. The list may be downloaded from a flash memory or similar device. The list also may be downloaded via a communication system such as a landline and wireless radio networks, a global satellite network, and the like.

The matching unit and database 7 uses the mapped recognition results from the mapping unit 6 and selects the best matching list elements from the list contained in the database to generate a second vocabulary 8. The second vocabulary 8 can include a smaller amount of list elements than the whole list contained in the matching unit and database 7. The speech recognition unit 9 is configured with the second vocabulary 8 to compare the list elements of the sub-list with the voice input of the user stored in the recording unit 5. The speech recognition unit 3 may be used as the speech recognition unit 9, and vice versa, such that the desired vocabulary 4, 8 may be used for configuring either the first speech recognition unit 3 or the second speech recognition unit 9, or both.

The speech recognition system 1 provides an acoustical and/or optical transmission of a list element from the output unit 10 in response to the recognition result. The acoustical output may be provided via a speaker or the like and the optical output may be provided via a display unit or the like. The list elements outputted from the sub-list include elements recognized as the most likely elements in accordance the voice input of the user.

Figure 2:
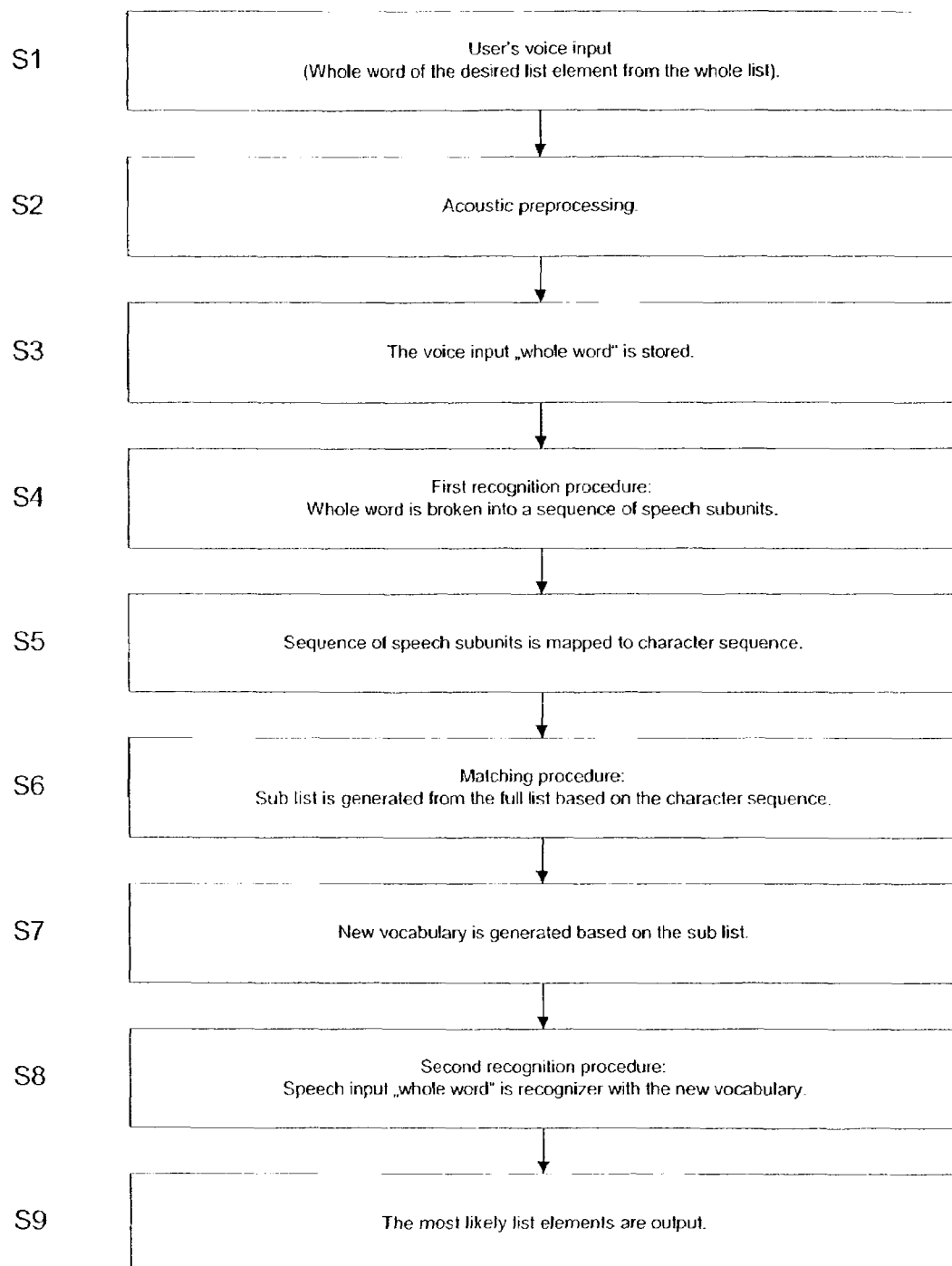
FIG. 2 is a flowchart of a method for recognizing speech to select a list element from a list of list elements.

FIG. 2 is a flowchart of a process for recognizing speech to select a list element from a list of list elements. To select the desired list element the user speaks S1 the full description of the desired list element. The list element includes, for example, the name of a city or street for destination input in a navigation system or the name of a person when selecting from a telephone list. The voice input may be acoustically processed S2 to reduce or eliminate unwanted environmental noises and the like. During or before performance of the first recognition process, the voice input of the user is stored S3 in the recording unit 5 for use by the second recognition process.

The first recognition process may be performed with the first speech recognition unit 3 that is configured with a first vocabulary 4. The first vocabulary 4 includes speech subunits, e.g., phonetic units, used to separate the voice input into parts. The first speech recognition unit 3 is configured to recognize the speech subunits such as parts of phonemes, whole phonemes, letters, syllables, and the like. Independent from the list of list elements to be searched, the first recognition process separates S4 the voice input of the user into the desired parts, e.g., part of a phoneme, at least one phoneme, at least one letter, at least one syllable, or the like. A sequence of speech subunits is constructed that includes a sequence of consecutive phoneme parts, a sequence of phonemes, a sequence of letters, a sequence of syllables or the like. The first speech recognition unit 3 can also generate several alternative sequences of speech subunits that typically include similar or easily confusable subunits. For example, the speech recognition unit can generate between three and five such alternate sequences.

After the first recognition process separates the voice input of the user into speech subunits, the at least one sequence of speech subunits is mapped S5 onto at least one sequence of consecutive characters. The mapped characters may be used for the matching process that matches the characters with the list elements of the list. For example, the characters of the character sequences might represent phonemes, letters, or syllables or the like. The sequences of speech subunits are mapped onto sequences of phonemes, letters, syllables, or the like. The speech subunits of the at least one speech subunit sequence are represented in a way that is suitable for the matching process with the list elements of the list.

The matching process compares the mapped character sequences and the list elements of the list and generates a sub-list S6 from the database 7 containing the full list of list elements. Therefore, the sub-list is constructed as a reduced number of elements of the full list. Mapping depends on the type of matching process utilized and the characters of the at least one character sequence and the representation of the list elements of the list to be matched. For example, the matching process can either use the speech subunits themselves (that is, for the matching process the characters of the at least one character sequence correspond directly to the representation of the speech subunits) or the sequence of speech subunits may be mapped onto a character sequence (e.g., by transforming the phonemes of the sub language units to letters). If the matching process does not require the same representation of the at least one character sequence and the list elements, e.g., by using an automatic transcription, the matching process can directly construct phoneme sequences with letter sequences. The at least one sequence of sub speech subunits may be used directly as character sequence for the matching process without any additional mapping. Preferably however, the same representation is used in the matching process for both the at least one character sequence and the list elements of the list. The mapping process may be avoided if the representation is the same for both the at least one speech subunit sequence and the list elements, e.g., the speech subunits are phonemes and phonetic transcriptions are available for each list element. If the representations differ, the representations of the speech subunits and the list elements are mapped to be the same. For example, if the speech subunits are phonemes and the list elements are represented by letter sequences, then the phonemes are mapped to letters prior to mapping or the letters may be mapped to phonemes. The at least one sequence of speech subunits are mapped to at least one character sequence. Preferably, a hypothesis list of several character sequences with similar or easily confusable characters is generated from the speech subunit sequences.

As part of the matching process, the list elements of the full list may be scored (e.g., using a percentage that the list element is a match) and the list elements with the best scores (e.g., highest probabilities) are included in the sub list S7. The best scores may be awarded to those list elements with the best fit to the at least one character sequence. In that way the matching process includes an error tolerant filtering process of the full list or the database containing all list elements. Error tolerance is used since the at least one character sequence from the first recognition process might be erroneous. For example, the speech recognition unit may have selected the wrong speech subunits or the mapping process may not accurately map the at least one speech subunit sequence to the at least one character sequence. Likewise, the pronunciation of the list element by the user might be erroneous.

A maximum number of list elements located in the sub-list can depend on the available memory of the speech recognition system and the properties of the speech recognition unit. Within these limitations and considering the size of the full list in the database and the minimum number of spoken characters (letters, phonemes, syllables, etc.) the number of elements in the sub-list may be fixed or variable as a parameter for the matching process. Preferably the number of list elements contained in the sub-list is large enough to increase the probability of the "correct" list element being contained in the sub list, and thus included in the vocabulary of the second recognition process. Typically, the sub-list contains between several hundred and several thousand list elements. For example for the input of city names in a navigation system on the order of 500 to 1000 list elements seem appropriate.

The second recognition process is performed S8 on the recorded speech input with the second recognition unit 9 configured with a second vocabulary 8 that was generated from the sub-list. The stored utterance is delivered to the second recognition unit 9 configured with the sub list (the list elements of the sub-list) as vocabulary. The second vocabulary 8 may be generated using either the extracted entries of the list elements of the sub list (i.e., based on the text in the list elements such as ASCII-text) or using phonetic transcriptions assigned to the list elements, if available (i.e., based on phonetic transcriptions such as IPA or SAMPA transcriptions). The second vocabulary 9 is loaded into the second speech recognition unit 9. A higher quality and thus a higher recognition rate may be achieved if phonetic transcriptions are assigned to the list elements such as proper names (e.g., city names or names in an address book) since proper names often do not follow the normal pronunciation rules of the language.

At least one result S9 of the second recognition process is outputted. The result of the second recognition process is at least one list element having the highest probability of corresponding to the voice input of the user. Preferably more than one "probable" list element is selected. Typically the speech recognition unit selects the five to ten most probable list elements. The recognition result is displayed to the user in an appropriate form such as an an output unit or a display device in accordance with optical and/or acoustical output.

For illustrations purposes and not as a limitation, the process is presented using "Blaustein" as an example of a list element from a list containing names of places in Germany as the list elements. The user speaks S1 the voice input to an input unit or microphone of a speech recognition system. The voice input includes a whole word of the desired list element such as "Blaustein." The voice inputted whole word, e.g., "Blaustein" is stored S3 in a recording unit 5. Other words can also be spoken by the user that correspond to a list element that the user desires to select, such as the name of a person, such as in the case of making a selection from a telephone data base or an address data base.

The input unit 2 or the speech recognition unit 3 or another component of the speech recognition system 1 can acoustically process S2 the voice input to reduce or eliminate unwanted environmental noises and the like. In a first recognition procedure, the speech recognition unit 3 can also separate into speech subunits S4 the outputted whole word, e.g., "Blaustein." To separate the whole word, the speech recognition unit 3 may be configured with the first vocabulary 4 that contains, e.g., phonemes or other elements to aid in breaking down the whole word. At least one result or a plurality of resulting sequences of speech subunits may be generated from the voice input of the user. Sequences of the speech subunits may be composed of subunits that are similar to each other or that may be confused with each other. For example, for the term "Blaustein," three sequences of phonemes may be generated (using SAMPA notation) as "l a: n S t a I n", "t r a U n S t a I n", "g r a U S t a I n." Three sequences are shown for explanation purposes, but other amounts of sequences may also be used such as one or five.

The sequences of the speech subunits, e.g., the sequences of phonemes, may be mapped S5 by the mapping unit 6 to form a sequence of characters. The phoneme sequences "l a: n S t a I n", "t r a U n S t a I n", "g r a U S t a I n." may be converted into character sequences "L A H N S T E I N" and "G R A U S T E I N", which contain 9 letters, and the character sequence "T R A U N S T E I N" that contains 10 letters. A hypothesis list of character sequences, or letter sequences, is therefore created. The hypothesis list may contain character sequences having similar-sounding and/or easily confused letters.

The matching procedure S6 compares at least one character sequence from the generated hypothesis list of character sequences with a list of elements. For example, character sequences "L A H N S T E I N," "G R A U S T E I N" and "T R A U N S T E I N", which were configured by the mapping unit 6 may be compared with a list of elements, e.g., names of places, represented by the whole list of elements stored in the matching unit and database 7. Depending on the matching procedure used, the mapping procedure may not be necessary. The hypothesis list may be formed from the sequence of phonemes instead of characters. The comparison procedure generates a sub-list of list elements, e.g., names of places, the letters of that correspond identically to or are similar to the characters of the character sequences of the hypothesis list. The list elements, e.g., names of places, having letters that sound similar to the letters in the character sequences may be added to the hypothesis list and accounted for in the matching procedure. For example, the place names "Blaustein", "Lahnstein", "Traunstein", "Graustein", etc. can also be considered as list elements of the generated sub-list.

The second vocabulary 8 is generated S7 in accordance with the sub-list, e.g., the list elements such as place names generated from the comparison of the whole list of place name with the hypothesis list. The second vocabulary 8 may be used during a second recognition procedure. In this regard, the second speech recognition unit 9 is configured with this sub-list via the second vocabulary 8. Therefore, the second speech recognition unit 9 has access to a refined and substantially reduced list compared with the whole list of names.

During the second recognition procedure S8, the inputted whole word is matched with a list element contained in the sub-list of the second vocabulary 8. The speech recognition unit 9 can access from the recording unit 5 the inputted whole word, e.g., "Blaustein." The whole word is compared with the list elements contained in the sub-list, e.g., names of places such as "Blaustein", "Lahnstein", "Traunstein", "Graustein", etc. In accordance with processing by the speech recognition unit 9, at least one list element is selected as the list element that most likely matches the voice input of the user. For example, at least one place name, is selected as the recognition result of the second recognition procedure. A plurality of list elements may be selected from the sub-list as most likely to correspond to the spoken whole word, e.g., "Blaustein," such as "Blaustein", "Lahnstein," "Traunstein" and "Graustein". In a typical implementation, the second speech recognition unit 9 can generate five to ten list elements as the most likely elements to match the element desired by the user.

The recognition result of the speech recognition unit 9, e.g., the four place names "Blaustein", "Lahnstein", "Traunstein", "Graustein," may be communicated to the user S9. The recognition results may be communicated via an acoustic output unit 10 such as a speaker. The recognition results may be communicated via an optical output unit such as a display. The user can select the desired list element from the recognition result list.

While various embodiments of the invention have been described, it will be apparent to those of ordinary skill in the art that many more embodiments and implementations are possible that are within the scope of the invention.

What is claimed is:

1. A method for speech recognition to select a list element from a list of list elements, comprising:
   storing a voice input, where the voice input comprises a whole word of a desired list element;
   separating the voice input into multiple speech subunits;
   forming at least one sequence of speech subunits in accordance with the separated voice input;
   configuring a speech recognition unit in response to the at least one sequence of speech subunits;
   generating with a first recognition procedure a sub-list of list elements from the list of list elements in response to the at least one sequence of speech subunits wherein upon determination that the representation of the list of list element is different from the representation of the speech subunits, the first recognition procedures comprises mapping the representation of the list of list element to that of the speech subunits, or mapping the representation of the speech subunits to that of the list of list elements;
   comparing with a second recognition procedure the list elements in the sub-list with the stored whole word voice input; and
   selecting at least one list element of the sub-list as a recognition result.

2. The method according to claim 1 where the recognition result comprises a list element to match the desired list element.

3. The method according to claim 1 further comprising forming at least one character sequence out of at least one sequence of speech subunits.

4. The method according to claim 3 where the characters of the at least one character sequence and the list elements of the whole list are presented identically.

5. The method according to claim 3 where the characters of at least one character sequence and the list elements of the list are presented as at least one of letters and phonetic characters.

6. The method according to claim 3 where representation of the characters of the at least one character sequence is specified in response to the representation of the list elements of the list.

7. The method according to claim 6 where the characters of the at least one character sequence and the list elements of the list represent at least one of letters and phonetic characters.

8. The method according to claim 1 where the first recognition procedure further comprises comparing a hypothesized list composed of a plurality of different character sequences with the list of list elements.

9. The method according to claim 8 further comprising:
   forming the at least one sequence of speech subunits using speech subunits having similar characters; and
   generating character sequences of the hypothesized list in response to the at least one sequence of speech subunits.

10. The method according to claim 1 further comprising acoustically communicating the at least one selected list element to the user.

11. The method according to claim 1 further comprising optically communicating the at least one selected list element to the user.

12. The method according to claim 1 further comprising:
    forming at least one character sequence in response to the at least one sequence of speech subunits, where the character sequence comprises at least one character; and
    generating the sub-list of list elements in response to the at least one character sequence.

13. The method according to claim 1 implemented in at least one of a destination guidance system, a navigation system, a directory assistance system and a system for querying a data base.

14. A speech recognition system, comprising: an input unit;
    a first speech recognition unit connected to receive a voice input from the input unit, the first speech recognition unit configured with speech subunits as a first vocabulary for separating the voice input into speech subunits;
    a recording unit connected with the input unit, the recording unit to store the voice input where the voice input comprises a whole word;
    a database connected with the first speech recognition unit, the database containing a list of list elements for creating a sub-list in response to a match with at least one character sequence generated using the speech subunits, in accordance with the first speech recognition unit
    wherein upon determination that the representation of the list of list element is different from the representation of the speech subunits, the first speech recognition unit operates that the representation of the list of list elements is mapped to the representation of the speech subunits, or the representation of the speech subunits is mapped to the representation of the list of list elements;
    a second speech recognition unit connected with the recording unit, the second speech recognition unit configured with a second vocabulary created in response to the list elements of the sub-list, the second speech recognition unit for comparing the whole word voice input of the list element with the list elements of the sub-list; and
    an output unit connected with the second speech recognition unit, the output unit to transmit at least one of the list elements evaluated as being a match the list element.

15. The speech recognition system according to claim 14 further comprising a mapping unit connected with the first speech recognition unit, the mapping unit to image the speech subunits in response to the characters of the at least one character sequence.

16. The speech recognition system according to claim 14 implemented in one of a destination guidance system, a navigation system, a directory assistance system and a system for querying a data base.

17. A method for determining a list element from a list of list elements, comprising:

inputting a whole word of a list element, separating the inputted whole word into at least one subunit;

forming at least one sequence of subunits based on the inputted whole word, independently from the list of list elements;

processing one of the at least one sequence of subunits and the list of list elements in a form that can be compared, wherein upon determination that the representation of the list of list element is different from the representation of the subunits, the processing comprises mapping the representation of the list of list elements to that of the subunits, or mapping the representation of the subunits to that of the list of list elements;

matching the at least one subunit with a sub-list of list elements; and determining at least one list element from the sub-list tat matches the whole word, where the sequence of subunits is determined in a first recognition procedure and where the whole word recognition is performed in a second recognition procedure.

18. A method for speech recognition, comprising:

storing a list of list elements in a database, the list elements comprising data entries in list;

separating a voice input into multiple speech subunits;

forming at least one sequence of speech subunits;

generating, in a first recognition procedure, a hypothesis list of sequences by converting the at least one sequence of speech subunits into the hypothesis list of sequences having a form that can be compared with the list of list elements, wherein upon determination that the representation of the list of list element is different from the representation of the speech subunits, the generating in the first recognition procedure comprises mapping the representation of the list of list elements to that of the speech subunits, or mapping the representation of the speech subunits to that of the list of list elements;

comparing, in the first recognition procedure, the hypothesis list of sequences with at least one list element from the list of list elements;

generating the sub-list of list elements in response to the at least one character sequence;

comparing, in a second recognition procedure, the list elements in the sub-list with the voice input; and selecting at least one list element of the sub-list as a recognition result.

* * * * *

UNITED STATES PATENT AND TRADEMARK OFFICE
CERTIFICATE OF CORRECTION

PATENT NO.        : 7,392,189 B2
APPLICATION NO.   : 10/371982
DATED             : June 24, 2008
INVENTOR(S)       : Marcus Hennecke et al.

It is certified that error appears in the above-identified patent and that said Letters Patent is hereby corrected as shown below:

<u>In the Claims</u>

In column 9, line 17, after "list element from the sub-list" delete "tat" and substitute --that-- in its place.

Signed and Sealed this

Thirteenth Day of January, 2009

JON W. DUDAS
*Director of the United States Patent and Trademark Office*